Feb. 10, 1942.    A. W. HULL ET AL    2,272,747
GLASS TO METAL SEAL
Filed April 7, 1939

Inventors:
Albert W. Hull,
Louis Navias,
by Harry E. Dunham
Their Attorney.

Patented Feb. 10, 1942

2,272,747

UNITED STATES PATENT OFFICE 2,272,747

GLASS TO METAL SEAL

Albert W. Hull and Louis Navias, Schenectady, N. Y., assignors to General Electric Company, a corporation of New York Application April 7, 1939, Serial No. 266,604

5 Claims. (Cl. 49—92)

The present invention relates to improved glass-to-metal seals and to combinations of materials suitable for producing the same.

It has been pointed out in an article by A. W. Hull and E. E. Burger appearing in vol. 5, No. 12 of Physics for December 1934 that the thermal expansion characteristic of every glass is non-linear with temperature and possesses a region (transformation zone) of rapidly changing expansibility. The theoretically ideal glass-to-metal seal is one in which the coefficient of expansion of the metal varies from room temperature to the softening temperature of the glass along a thermal characteristic curve which essentially matches that of the glass at all points both above and below the transformation zone of the latter. In the same article, it is explained that this ideal condition is substantially fulfilled by the combination of certain named glasses with selected alloys of nickel, iron, and cobalt.

Seals embodying this combination have found wide acceptance in the art and have been used extensively in industry. For many uses, however, considerations of economy indicate the desirability of using sealing materials less costly than the alloys above referred to. In particular, there has long been a demand for a means of producing satisfactory seals in which the metal component consists simply of iron.

It is an object of the present invention to fill this demand by providing glass-to-iron sealing combinations useful in the class of application which is typified by lead-in connections for electronic discharge devices.

The problem is complicated not only by the difficulties of producing an hermetic joint between glass and a body consisting of iron, but also by the stringent requirements of the application referred to. Specifically, it is necessary that acceptable sealing combinations for lead-in connections possess the following qualifications:

(1) Low electrical conductivity of the glass.
(2) Ability to withstand continued exposure to the natural elements.
(3) Ability to withstand the corrosive effects of cleaning agents employed during fabrication processes.
(4) Resistance to heat-shock.

The seals which are to be described in the following satisfy all these criteria.

Figure 1:
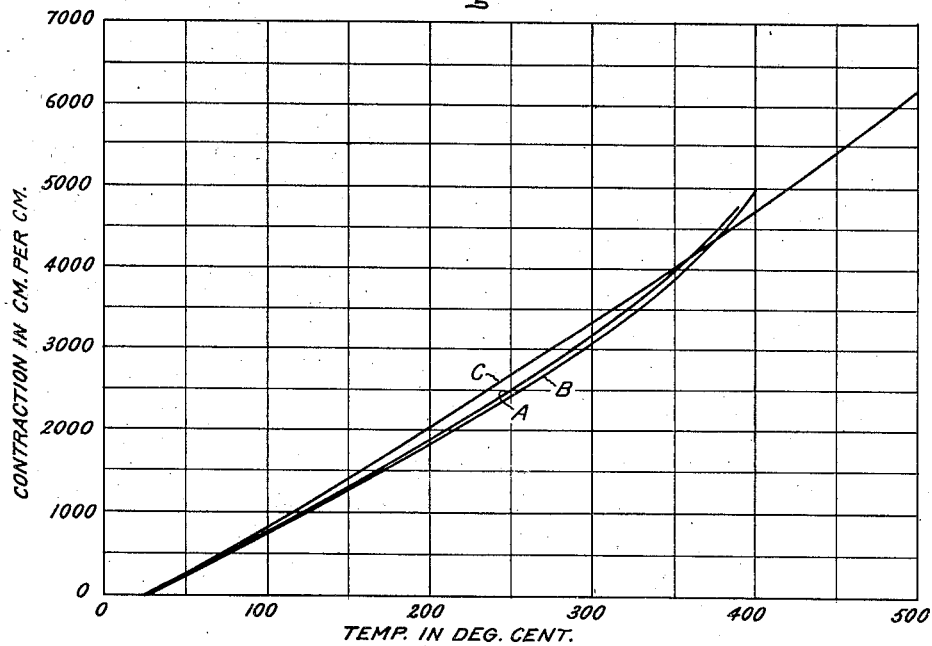
Figure 3:
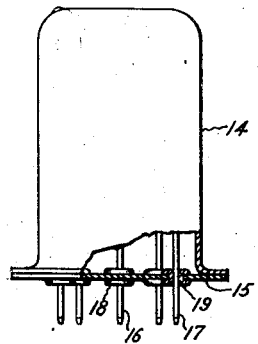
Figure 2:
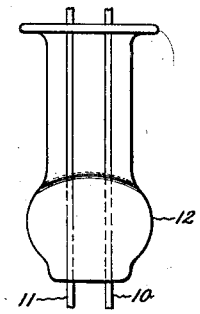

The features which we desire to protect herein are pointed out with particularity in the appended claims. The invention itself, together with further objects and advantages thereof, may best be understood by reference to the following description taken in connection with the drawing in which Fig. 1 represents the thermal contraction characteristics of two preferred glasses, and Figs. 2 and 3 show types of seals in which the invention may suitably be employed.

Iron possesses a substantially linear thermal expansion characteristic. For this reason, and in view of the non-linear form of glass expansion characteristics, it appears impossible to produce an iron-to-glass seal which is strain-free at all temperatures. However, by the use of certain glasses to be described in the following, we have found it possible to construct a seal which is substantially strain-free at room temperature and which is sufficiently free from strain at other temperatures to avoid cracking during fabrication or use.

The glasses referred to in the foregoing may be classified generally as those whose theoretical oxide compositions comprise: $SiO_2$ and $B_2O_3$ in the sum of from 40 to 50%, the $B_2O_3$ being present in the amount of less than 5%; $K_2O$ and $Na_2O$ in the sum of from 16 to 20%; PbO and BaO in the sum of from 28 to 35%, the PbO being present in the amount of at least 10%, and CaO and $CaF_2$ in the sum of from 3 to 6%. The percentage limitations given in the foregoing are critical in the sense that any substantial departure from them will produce a glass which is either incapable of sealing to iron or which fails to fulfill one or more of the qualifications listed above as necessary to a satisfactory sealing material.

As exemplary of the general classification given in the preceding paragraph the following particular glasses may be referred to:

|  | 541 | 542 | 596 | 546 | 591 | 595 |
|---|---|---|---|---|---|---|
| $SiO_2$ | 45 | 45 | 46 | 45 | 45 | 45 |
| $B_2O_3$ |  |  |  |  | 3 |  |
| $K_2O$ | 12 | 14 | 10 | 14 | 12 | 14 |
| $Na_2O$ | 6 | 6 | 6 | 6 | 6 | 6 |
| PbO | 32 | 30 | 33 | 31.5 | 29 | 10 |
| BaO |  |  |  |  |  | 20 |
| CaO |  |  |  | 3.5 |  |  |
| $CaF_2$ | 5 | 5 | 5 |  | 5 | 5 |

The glasses which we consider preferable at the present time are represented by the first three of those listed above in which $SiO_2$ is used to the exclusion of $B_2O_3$; PbO is used to the exclusion of BaO, and $CaF_2$ is used to the exclusion of CaO. However, we are aware that $B_2O_3$, BaO and CaO are in some respects the equivalents of the materials with which they are respectively grouped and we consider their use to be within the scope of our invention, at least to the extent indicated in the classification given above.

The amount of $B_2O_3$ which may be employed is limited by the eect which that constituent has on the ability of the glass to withstand weathering and subjection to cleaning agents. In general, it is inadvisable from the standpoint of vacuum tube manufacturing practice and analogous uses to employ a quantity of $B_2O_3$ in excess of about 5%. Similarly, we consider $CaF_2$ to be preferable to CaO because of its effect in producing a glass of superior chemical resistance.

The relative proportions of $K_2O$ and $Na_2O$ to be employed are determined by their relative effects on the electrical conductivity of the resulting product. Use of a predominant quantity of $K_2O$ results in a glass which is superior from this standpoint, and we, therefore, consider it advisable to use at least 10% of this substance.

All the glasses having compositions which have been described above have average coefficients of linear contraction in the approximate range of from $11.5 \times 10^{-6}$ to $13 \times 10^{-6}$ centimeters per centimeter per degree Centigrade, as measured from 300° C. to room temperature. In this respect they are well adapted for sealing with iron, whose contraction coefficient lies near the upper limit of this range.

The relationship between the contraction characteristic of cold rolled steel and the characteristics of two of the glasses described above is shown in Fig. 1 of the drawing. In this figure the curve A shows the variable contraction of a sample of glass #542 as the same is cooled from about 400° C. to room temperature, while curves B and C show the corresponding characteristics for glass #541 and for the metal referred to.

With #542 glass, the glass becomes substantially solid at about the point at which its contraction characteristic crosses that of the iron, that is to say, at about 370° C. It will be noted that the maximum departure of the curve A from curve C is relatively slight, amounting to a difference of less than $2.0 \times 10^{-4}$ centimeters per centimeter at about 310° C. Under these conditions the total stress produced in the glass is within safe limits, and there is little danger that the seal will be broken by strains set up during fabrication. Since the curves A and C pass through a common point at room temperature, it will be understood that a seal between the glass and the metal which they respectively represent will be substantially strain-free at that temperature.

Curve B, representing #541 glass, is generally similar to curve A except that its margin of departure from curve C is somewhat greater. This difference is not great, however, and for some uses, especially in the fabrication of metal radio tubes, it has been found to be an actual advantage in off-setting strains produced due to unequal heating of the glass and metal parts.

In Fig. 2 of the drawing there is illustrated an exemplary application of the invention in connection with a flared stem tube suitable for use with a lamp, vacuum tube, or the like. It will be understood in this connection that the lead-in wires 10 and 11 are constituted of iron, while the glass part 12, which is pressed into contact with the conductors, consists of one of the glasses enumerated in the foregoing. By the use of our invention it is readily possible to fabricate vacuum-tight seals of the character illustrated, and with proper annealing treatment very much larger masses of iron and glass may be joined without breaking.

In Fig. 3 we have shown the use of the invention in connection with a metal enclosed vacuum tube. In this case, the tube comprises a cylindrical metal shell 14 closed at its lower end by means of an apertured closure member 15 which is peripherally joined to the shell, for example, by welding or soldering. Lead-in connections for the enclosed electrode structure (not shown) project through openings in the header 15 as indicated at 16 and 17. Beads of glass 18 and 19 serve to support the lead-in conductors in insulatingly spaced relation from the header. In accordance with our present invention both the header 15 and the conductors 16 and 17 may be constituted of iron or of a material having substantially the expansion characteristics of iron and the beads 18 and 19 may comprise a glass of the character which we have described above.

By the term "iron" as used herein, we intend to refer to any materials, and especially low carbon steels, which have substantially the expansion characteristics of pure iron. In this category may be included, for example, cold rolled steel, wrought iron, and deep drawing steel.

For certain applications it may be desirable to utilize a material having somewhat different physical properties from ordinary iron. For example, in connection with the vacuum tube of Fig. 3 it is advantageous to have the outwardly projecting extremities of the conductors 16 and 17 constituted of a material which is relatively resistant to oxidation. This change may be made without departing from our present invention by making the conductors as a whole of a chemically inactive alloy having substantially the expansion characteristics of the iron header, so that a glass which seals to one will also seal to the other. An arrangement of this kind is described and claimed in A. W. Hull application, Serial No. 266,603, filed April 7, 1939, which issued as Patent No. 2,239,423, April 22, 1941, wherein it is explained that lead-in conductors corresponding to conductors 16 and 17 may be constituted of a nickel-iron alloy containing from 70 to 80% nickel and the remainder iron. Such alloys have expansion characteristics substantially the same as that of iron but are more highly resistant to chemical attacks.

In some types of seals it may also be desirable to treat the surfaces of the iron parts in order to obtain better adherence between the iron and the glass. For example, one may employ a thin plating of copper for this purpose. Obviously this variation does not take the seal outside the scope of our invention, provided use is made of the glasses which we have described herein.

While we have referred herein to particular compositions and have described their use in connection with specific structures, it will be understood that numerous modifications may be made by those skilled in the art without departing from our invention. We, therefore, aim in the appended claims to cover all such equivalent variations as fall within the true spirit and scope of the foregoing disclosure.

What we claim as new and desire to secure by Letters Patent in the United States is:

1. In sealed combination, a metal having substantially the expansion characteristics of iron and a glass which contains about 45% $SiO_2$, about 12% $K_2O$, about 6% $Na_2O$, about 32% PbO and about 5% $CaF_2$.

2. In sealed combination, a metal having substantially the expansion characteristics of iron and a glass which contains about 45% $SiO_2$, about 3% $B_2O_3$, about 12% $K_2O$, about 6% $Na_2O$, about 29% PbO and about 5% $CaF_2$.

3. In sealed combination, a metal having substantially the expansion characteristics of iron and a glass containing about 45% $SiO_2$, about 14% $K_2O$, about 6% $Na_2O$, about 20% BaO, about 10% PbO and about 5% $CaF_2$.

4. In sealed combination, a metal having substantially the expansion characteristics of iron, and a glass which contains from 40 to 50% of oxides of the group consisting of $SiO_2$ and $B_2O_3$, the $B_2O_3$ being present, if at all, in the amount of less than 5%; from 16 to 20% of oxides of the group consisting of $K_2O$ and $Na_2O$; from 28 to 35% of oxides of the group consisting of PbO and BaO, the PbO being present in the amount of at least 10%; and from 3 to 6% of materials of the group consisting of CaO and $CaF_2$.

5. A vacuum-tight lead-in seal for an electrical device including the combination of a metal having substantially the expansion characteristics of iron and a glass which contains from 40 to 50% of oxides of the group consisting of $SiO_2$ and $B_2O_3$, the $B_2O_3$ being present, if at all, in the amount of less than 5%; from 16 to 20% of oxides of the group consisting of $K_2O$ and $Na_2O$, the $K_2O$ being present in the amount of at least 10%; from 28 to 35% of oxides of the group consisting of PbO and BaO, the PbO being present in the amount of at least 10%, and from 3 to 6% of materials of the group consisting of CaO and $CaF_2$.

ALBERT W. HULL.
LOUIS NAVIAS.